US012641365B2

(12) United States Patent
Miyazaki et al.

(10) Patent No.: US 12,641,365 B2
(45) Date of Patent: May 26, 2026

(54) CONTROL APPARATUS AND SPEAKER CONTROL METHOD

(71) Applicant: NEC Corporation, Tokyo (JP)

(72) Inventors: Takashi Miyazaki, Tokyo (JP);
Takahiro Matsui, Tokyo (JP); Satoshi Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 199 days.

(21) Appl. No.: 18/281,348

(22) PCT Filed: Mar. 17, 2021

(86) PCT No.: PCT/JP2021/010859
§ 371 (c)(1),
(2) Date: Sep. 11, 2023

(87) PCT Pub. No.: WO2022/195773
PCT Pub. Date: Sep. 22, 2022

(65) Prior Publication Data
US 2024/0155287 A1    May 9, 2024

(51) Int. Cl.
*H04R 1/40* (2006.01)
*G06F 3/01* (2006.01)
*H04R 3/12* (2006.01)

(52) U.S. Cl.
CPC ............. *H04R 1/403* (2013.01); *G06F 3/011* (2013.01); *H04R 3/12* (2013.01)

(58) Field of Classification Search
CPC ............ H04R 1/403; H04R 3/12; G06F 3/011
See application file for complete search history.

(56) References Cited

U.S. PATENT DOCUMENTS

2013/0121510 A1* 5/2013 Yuasa ...................... H03G 3/02
381/109

FOREIGN PATENT DOCUMENTS

| EP | 2390874 A1 * | 11/2011 | ........... G10K 11/175 |
| JP | 2010-026551 A | 2/2010 | |
| JP | 2012-138040 A | 7/2012 | |

(Continued)

OTHER PUBLICATIONS

English machine translation of JP2017123505A (Sugama, Kosuke; Content Playback Device, Content Playback Method, and Program; published Jul. 2017) (Year: 2017).*

(Continued)

*Primary Examiner* — Mark Fischer
(74) *Attorney, Agent, or Firm* — Sughrue Mion, PLLC

(57) ABSTRACT

A control apparatus (10) includes a position information acquiring unit (110) and a control unit (120). The position information acquiring unit (110) acquires information (position information) indicating a position of a person in a store. The position information acquiring unit (110) generates position information by, for example, acquiring and processing image data generated by an image capture apparatus installed in the store in real time. The control unit (120) controls a plurality of speakers (22 and 24) in the store independently of each other by using the position information generated or acquired by the position information acquiring unit (110). A target of control to be performed herein includes, as described above, at least one of selection of sound data to be supplied, a timing of supplying sound data, and a sound volume.

7 Claims, 7 Drawing Sheets

(56) References Cited

FOREIGN PATENT DOCUMENTS

| | | | |
|----|------------------|---|--------|
| JP | 2014-021848 | A | 2/2014 |
| JP | 2015-164252 | A | 9/2015 |
| JP | 2017-123505 | A | 7/2017 |
| JP | 2017-147512 | A | 8/2017 |
| JP | 2020-014084 | A | 1/2020 |
| JP | 2020-061617 | A | 4/2020 |

OTHER PUBLICATIONS

International Search Report for PCT Application No. PCT/JP2021/010859, mailed on Apr. 27, 2021.
JP Official Communication for JP Application No. 2023-506599, mailed on Jan. 28, 2025 with English Translation.

* cited by examiner

| SOUND DATA | OUTPUT DESTINATION |
|------------|--------------------|
| A | SPEAKER 22 |
| B | SPEAKER 24 |

SPEAKER 22

| SOUND DATA | ATTRIBUTE |
| --- | --- |
| A | WOMAN |
| C | MAN |

SPEAKER 24

| SOUND DATA | ATTRIBUTE |
| --- | --- |
| B | WOMAN |
| D | MAN |

CONTROL APPARATUS AND SPEAKER CONTROL METHOD

This application is a National Stage Entry of PCT/JP2021/010859 filed on Mar. 17, 2021, the contents of all of which are incorporated herein by reference, in their entirety.

TECHNICAL FIELD

The present invention relates to a control apparatus, a speaker control method, and a system.

BACKGROUND ART

In a store, it is often a case that a plurality of speakers are disposed to play music or output a voice guidance. In most cases, same voice is output from these plurality of speakers.

Note that, Patent Document 1 discloses a navigation apparatus for guiding a beneficiary by using a sound. The navigation apparatus, first, outputs a trigger sound from a speaker, and detects a reaction of a person who heard the trigger sound. Then, by the reaction, it is determined whether the person is a beneficiary. Then, the navigation apparatus outputs a guiding sound to the beneficiary. The guiding sound is a sound for guiding the beneficiary to a sweet spot of a parametric speaker. When the beneficiary moves to the sweet spot, the navigation apparatus outputs a guiding sound from the parametric speaker.

RELATED DOCUMENT

Patent Document

Patent Document 1: Japanese Patent Application Publication No. 2020-14084

SUMMARY OF INVENTION

Technical Problem

In a store, providing information to a person such as a customer is effective. The inventors of the present application have investigated a technique for making a person easy to recognize information, in a case where the information is provided to the person by using a voice. One of objects of the present invention is to make it easy for a person in a store to recognize information provided by a voice.

Solution to Problem

The present invention provides a control apparatus including:

a position information acquiring unit that acquires position information indicating a position of a person in a store; and a control unit that controls a plurality of speakers installed at a position different from each other in the store by using the position information, wherein the control unit controls a control target for the plurality of speakers by using the position information, the control target including at least one of a type of sound data to be supplied, a sound volume, and a timing at which the sound data are supplied to the speaker.

The present invention provides a control apparatus including:

an image data acquiring unit that acquires image data indicating inside a store;

an image processing unit that generates person information being information relating to a person in the store by processing the image data; and a control unit that controls a plurality of speakers installed in the store independently of each other by using the person information.

The present invention provides a control method including, by a computer:

position information acquiring processing of acquiring position information indicating a position of a person in a store; and control processing of controlling a plurality of speakers installed at a position different from each other in the store by using the position information, wherein the control processing includes, by the computer, controlling a control target for a plurality of speakers by using the position information, the control target including at least one of a type of sound data to be supplied, a sound volume, and a timing at which the sound data are supplied to the speaker.

The present invention provides a control method including, by a computer:

image data acquiring processing of acquiring image data indicating inside a store;

image processing of generating person information being information relating to a person in the store by processing the image data; and control processing of controlling a plurality of speakers installed in the store independently of each other by using the person information.

The present invention provides a program causing a computer to include:

a position information acquiring function of acquiring position information indicating a position of a person in a store; and a control function of controlling a plurality of speakers installed at a position different from each other in the store by using the position information, wherein the control function controls a control target being at least one of a type of sound data to be supplied, a sound volume, and a timing at which the sound data are supplied to the speaker by using the position information for a plurality of speakers.

The present invention provides a program causing a computer to include:

an image data acquiring function of acquiring image data indicating inside a store;

an image processing function of generating person information being information relating to a person in the store by processing the image data; and a control function of controlling a plurality of speakers installed in the store independently of each other by using the person information.

The present invention provides a system including the above-described control apparatus, and the above-described plurality of speakers.

Advantageous Effects of Invention

The present invention makes it easy for a person in a store to recognize information provided by a voice.

BRIEF DESCRIPTION OF DRAWINGS

The above-described object, the other objects, features, and advantages will become more apparent from suitable example embodiments described below and the following accompanying drawings.

FIG. 2 It is a diagram illustrating one example of a functional configuration of the control apparatus.

FIG. 3 It is a diagram illustrating a first example of data stored in a sound data storage unit.

FIG. 4 It is a diagram illustrating a second example of data stored in the sound data storage unit.

DESCRIPTION OF EMBODIMENTS

Hereinafter, example embodiments according to the present invention are described by using the drawings. Note that, in all drawings, a similar constituent element is indicated by a similar reference sign, and description thereof will not be repeated as appropriate.

First Example Embodiment

Figure 1:
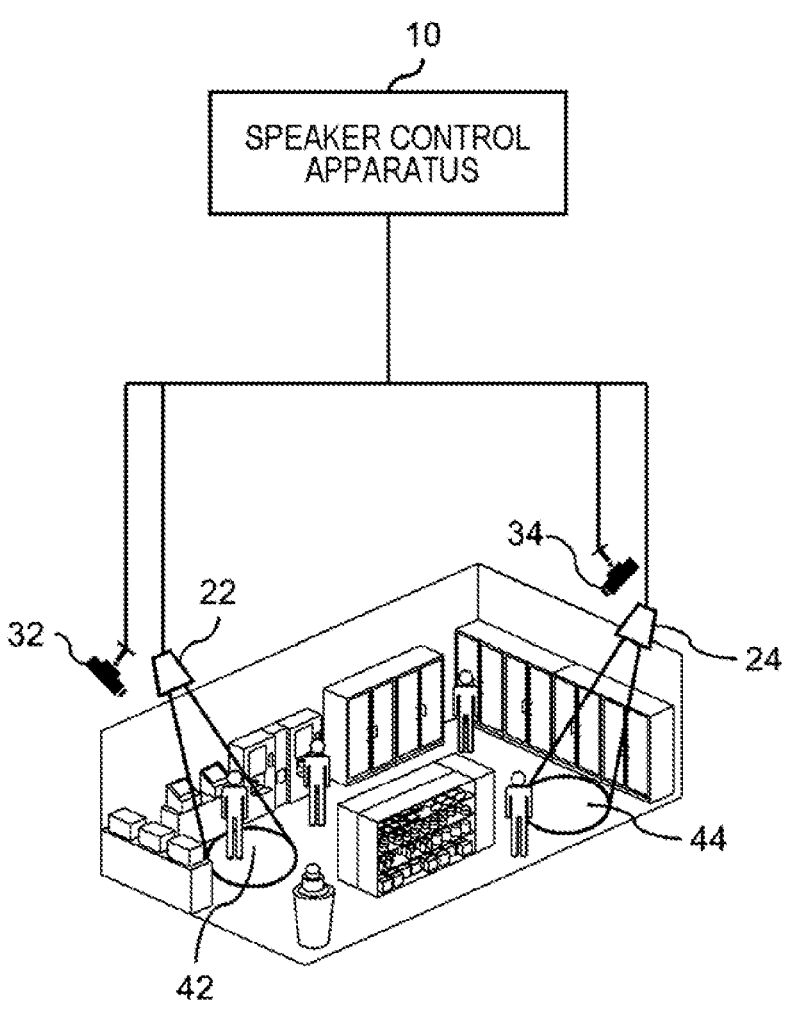
FIG. 1 It is a diagram illustrating a usage environment of a control apparatus according to a first example embodiment.

FIG. 1 is a diagram illustrating a usage environment of a control apparatus 10 according to a present example embodiment. The control apparatus 10 is a part of a system. The system includes a plurality of speakers, in addition to the control apparatus 10. The control apparatus 10 controls the plurality of speakers (in the example illustrated in FIG. 1, speakers 22 and 24) independently of each other. Control to be performed independently herein includes at least one of selection of sound data to be supplied, a timing of supplying sound data, and a sound volume.

The plurality of speakers are installed away from each other in a same store. In a case where a plurality of floors are present in a store, the above-described plurality of speakers are disposed on a same floor. Further, a sensor for generating information (hereinafter, described as position information) indicating a position of a person is provided in the store. One example of the sensor is an image capture apparatus. In this case, position information is generated by processing image data generated by the image capture apparatus. Then, the control apparatus 10 controls the above-described plurality of speakers by using the position information.

In the present example embodiment, both of the speakers 22 and 24 include directivity. One example of the speakers 22 and 24 is a parametric speaker. In a case where position information indicates that a person is present in a range (hereinafter, described as a partial area 42) where a sound from the speaker 22 can be heard, the control apparatus 10 supplies first sound data to the speaker 22. Further, in a case where position information indicates that a person is present in a range (hereinafter, described as a partial area 44) where a sound from the speaker 24 can be heard, the control apparatus 10 supplies second sound data to the speaker 24. First sound data and second sound data indicate, for example, information relating to a product. As one example, first sound data are information relating to a product disposed near the partial area 42, and second sound data are information relating to a product disposed near the partial area 44.

Note that, the partial areas 42 and 44 include, for example, at least one of in front of a cash register counter, in front of a terminal to be operated by a customer, and in front of a predetermined product shelf. Herein, one example of a terminal to be operated by a customer is a kiosk terminal, an automated teller machine (ATM), or a self-type POS terminal.

In the example illustrated in FIG. 1, an image capture apparatus 32 including the partial area 42 as an image capture range, an image capture apparatus 34 including the partial area 44 as an image capture range are provided in a store. Then, in a case where image data generated by the image capture apparatus 32 include a person, the control apparatus 10 supplies first sound data to the speaker 22. Further, in a case where image data generated by the image capture apparatus 34 include a person, the control apparatus 10 supplies second sound data to the speaker 24. Note that, a framerate of image data to be generated by the image capture apparatuses 32 and 34 is, for example, five frames/second or more, but may be more than the above, or may be less than the above.

Note that, in a case where a person is present in a specific area among image data generated by the image capture apparatus 32, the control apparatus 10 may supply first sound data to the speaker 22. Further, in a case where a person is present in a specific area among image data generated by the image capture apparatus 34, the control apparatus 10 may supply second sound data to the speaker 24.

Further, in a case where both of the partial areas 42 and 44 are included in an image capture range of one image capture apparatus, the control apparatus 10 may determine whether a person is present in the partial area 42, and further determine whether a person is present in the partial area 44 by processing image data generated by the image capture apparatus.

Further, a sensor for generating position information may be a human sensor such as an infrared sensor. In this case, a human sensor is provided at a plurality of positions in a store. When a person is detected, these human sensors output identification information of the human sensor to the control apparatus 10. The control apparatus 10 stores identification information of a human sensor in association with information indicating a detection range of the human sensor. Therefore, the control apparatus 10 can generate the above-described position information by using received identification information of the human sensor.

Figure 2:
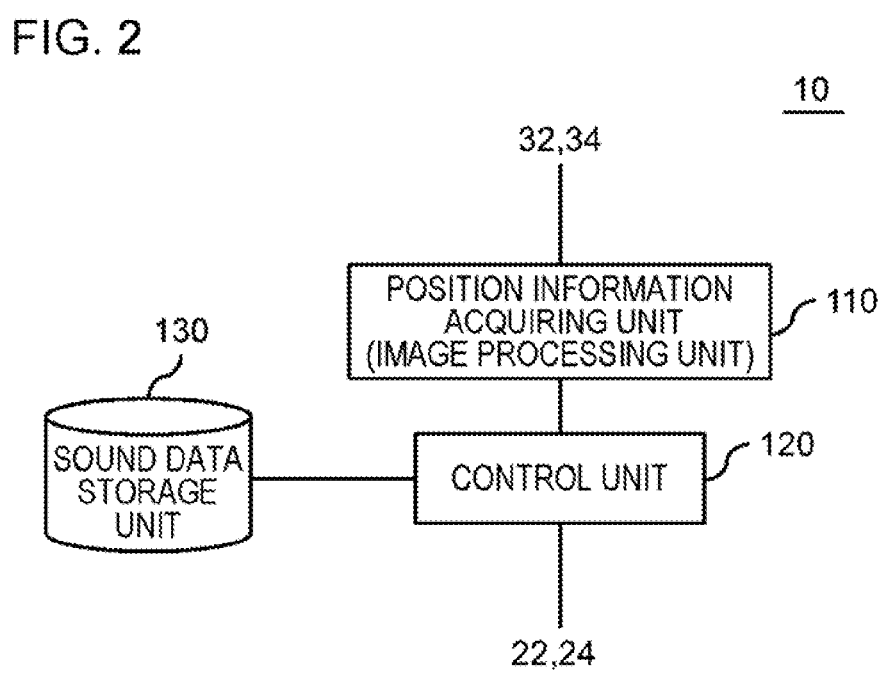

FIG. 2 is a diagram illustrating one example of a functional configuration of the control apparatus 10. In the example illustrated in FIG. 2, the control apparatus 10 includes a position information acquiring unit 110 and a control unit 120.

The position information acquiring unit 110 acquires position information. In the example illustrated in FIG. 2, the position information acquiring unit 110 also functions as an image acquiring unit and an image processing unit, and generates the above-described position information by acquiring and processing image data generated by an image capture apparatus (e.g., the image capture apparatuses 32 and 34) installed in a store in real time. Note that, in a case where the above-described plurality of human sensors are used in place of the image capture apparatuses 32 and 34, the position information acquiring unit 110 generates the above-described position information by using received identification information of the human sensor.

Note that, in a case where an image acquiring unit and an image processing unit are provided outside the control apparatus 10, the position information acquiring unit 110 acquires position information generated by the image processing unit.

The control unit 120 controls a plurality of speakers (e.g., the speakers 22 and 24) in a store independently of each other by using position information generated or acquired by the position information acquiring unit 110. As described above, a target of control (hereinafter, described as a control target) to be performed herein includes at least one of selection of sound data to be supplied, a timing of supplying sound data, and a sound volume.

For example in a case where position information indicates that a person is present in the partial area 42 associated with the speaker 22, the control unit 120 supplies first sound data to the speaker 22. Further, in a case where position information indicates that a person is present in the partial area 44 associated with the speaker 24, the control unit 120 supplies second sound data to the speaker 24.

Further, there is a case that an attribute of a person can be determined by the above-described image processing. An attribute of a person is, for example, at least one of a gender, an age group, clothes, a pose, a gesture, a perspiring state (e.g., whether a person is perspiring), and information (hereinafter, described as face recognition information) that serves as master data for face recognition. One example of a pose and a gesture is a pose and/or an action when the person feels cold, and a pose and/or an action when the person feels hot. In this case, the above-described position information further includes an attribute of a person. Then, when the control unit 120 selects sound data (e.g., the above-described first sound data or second sound data) to be supplied to a speaker, an attribute of a person being present in a partial area associated with the speaker may be used. In other words, the control unit 120 may change sound data to be output to a speaker according to an attribute of a person. Further, in a case where face recognition information is included in an attribute of a person, specific sound data may be output to a specific person by using the face recognition information.

Sound data to be supplied to a speaker are stored in the sound data storage unit 130. Then, the control unit 120 reads the sound data from the sound data storage unit 130, and supplies the sound data to a speaker. In the example illustrated in FIG. 2, the sound data storage unit 130 is a part of the control apparatus 10. However, the sound data storage unit 130 may be located outside the control apparatus 10.

Note that, the control apparatus 10 may include a common mode in which same control is performed for a plurality of speakers, and an independent mode in which the plurality of speakers are controlled independently of each other. In this case, in a case of the independent mode, the control apparatus 10 controls the above-described control target among a plurality of speakers independently of each other by using the above-descried position information.

FIG. 3 is a diagram illustrating a first example of data stored in the sound data storage unit 130. In the example illustrated in FIG. 3, the sound data storage unit 130 stores sound data to be supplied to a speaker for each of a plurality of speakers. This allows the control unit 120 to read sound data from the sound data storage unit 130 for each speaker.

FIG. 4 is a diagram illustrating a second example of data stored in the sound data storage unit 130. In the example illustrated in FIG. 4, the sound data storage unit 130 stores sound data for each attribute of a person. More specifically, the sound data storage unit 130 stores sound data to be supplied to a speaker, and an attribute associated with the sound data for each of a plurality of speakers. This allows the control unit 120 to read, from the sound data storage unit 130, sound data according to an attribute of a person entering the partial area 42 (or the partial area 44), and supply the sound data to the speaker 22 (or the speaker 24). For example, the control unit 120 selects sound data including information relating to a product according to an age group or a gender. Further, in a case where an attribute includes at least one of a pose, a gesture, and a perspiring state, the control unit 120 may select sound data including information relating to a product according to the attribute. For example, in a case where it is possible to presume that the person feels hot from at least one of a gesture and a perspiring state, the control unit 120 selects sound data relating to a cool product (a beverage or a food product). Further, in a case where it is possible to presume that the person feels cold, the control unit 120 selects sound data relating to a warm product (a beverage or a food product). Note that, the control unit 120 may control a sound volume of the speaker 22 (or the speaker 24) according to an age group of a person entering the partial area 42 (or the partial area 44). For example, the control unit 120 increases the sound volume, as the age group is getting old.

Figure 5:
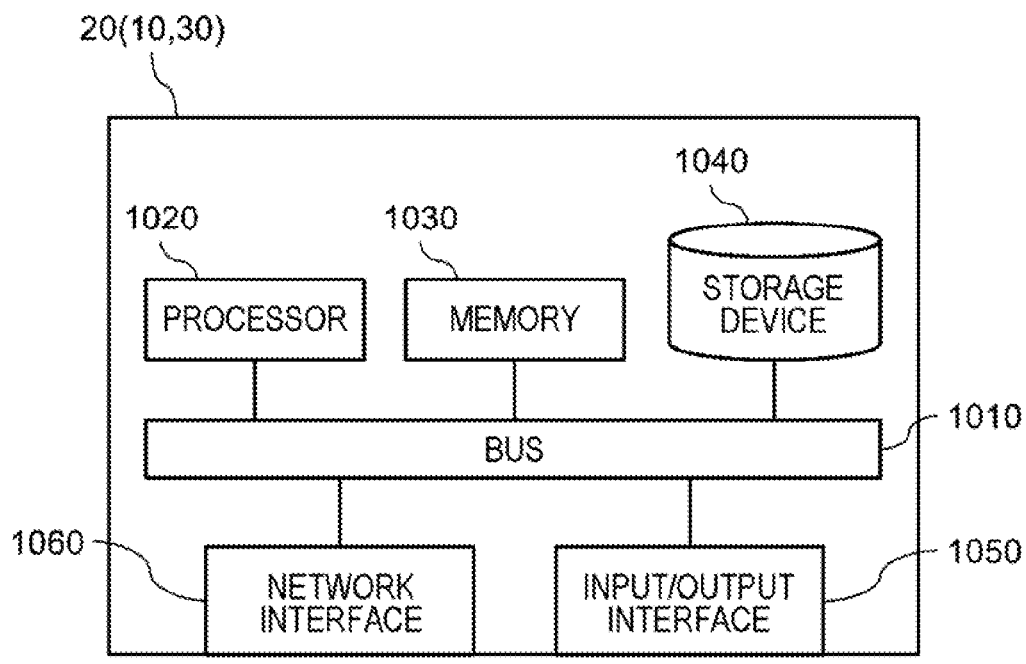
FIG. 5 It is a diagram illustrating a hardware configuration example of the control apparatus.

FIG. 5 is a diagram illustrating a hardware configuration example of the control apparatus 10. The control apparatus 10 includes a bus 1010, a processor 1020, a memory 1030, a storage device 1040, an input/output interface 1050, and a network interface 1060.

The bus 1010 is a data transmission path along which the processor 1020, the memory 1030, the storage device 1040, the input/output interface 1050, and the network interface 1060 mutually transmit and receive data. However, a method of mutually connecting the processor 1020 and the like is not limited to bus connection.

The processor 1020 is a processor to be achieved by a central processing unit (CPU), a graphics processing unit (GPU), or the like.

The memory 1030 is a main storage apparatus to be achieved by a random access memory (RAM) or the like.

The storage device 1040 is an auxiliary storage apparatus to be achieved by a hard disk drive (HDD), a solid state drive (SSD), a memory card, a read only memory (ROM), or the like. The storage device 1040 stores a program module for achieving each function of the control apparatus 10 (e.g., the position information acquiring unit 110 and the control unit 120). The processor 1020 achieves each function associated with a program module by reading each program module in the memory 1030 and executing each program module. Further, the storage device 104 also functions as the sound data storage unit 130.

The input/output interface 1050 is an interface for connecting the control apparatus 10 to a piece of input/output equipment of each type. For example, the control apparatus 10 may communicate with an image capture apparatus and a speaker via the input/output interface 1050. Note that, although not illustrated, the number of input/output interfaces 1050 may be increased or decreased according to the number of pieces of input/output equipment to be connected. For example, in the example illustrated in FIG. 1, four input/output interfaces 1050 may be provided.

The network interface 1060 is an interface for connecting the control apparatus 10 to a network. The network is, for example, a local area network (LAN) or a wide area network (WAN). A method of connecting the network interface 1060 to a network may be wireless connection, or may be wired connection. The control apparatus 10 may communicate with an image capture apparatus and a speaker via the network interface 1060.

Figure 6:
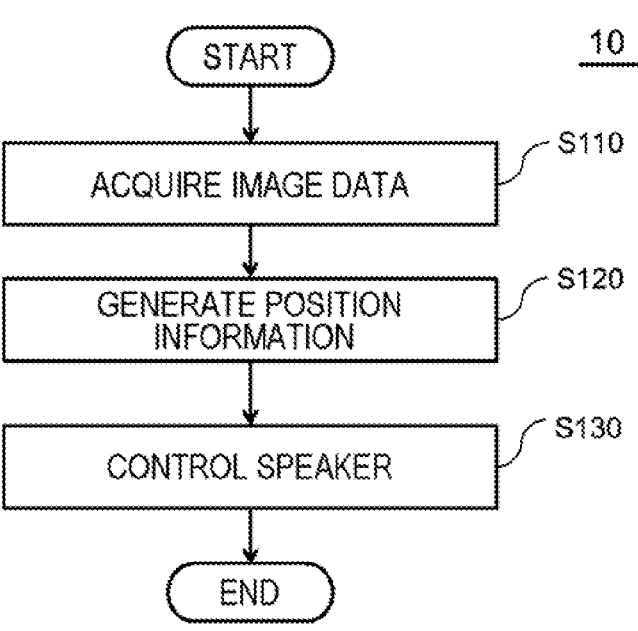
FIG. 6 It is a flowchart illustrating one example of processing to be performed by the control apparatus.

FIG. 6 is a flowchart illustrating one example of processing to be performed by the control apparatus 10. The control apparatus 10 repeatedly performs processing illustrated in FIG. 6.

When the image capture apparatuses 32 and 34 generate image data, the image capture apparatuses 32 and 34 immediately transmit the image data to the control apparatus 10. At this occasion, the image capture apparatuses 32 and 34 also transmit information for identifying the image capture apparatus. When the position information acquiring unit 110 of the control apparatus 10 acquires image data (step S110), the position information acquiring unit 110 generates the above-described position information by processing the image data. At this occasion, the position information acquiring unit 110 also generates information indicating an attribute of a person according to needs (step S120). The control unit 120 controls the speakers 22 and 24 independently of each other by using the information generated in step S120 (step S130). Details of control to be performed herein are as described by using FIGS. 1 and 2.

As described above, according to the present example embodiment, the control apparatus 10 controls a plurality of speakers (e.g., the speakers 22 and 24) installed in a store independently of each other according to a position of a person in the store. Control to be performed herein includes at least one of selection of sound data to be supplied, a timing of supplying sound data, and a sound volume. Therefore, a person in the store can easily recognize information provided by a voice.

Second Example Embodiment

Figure 7:
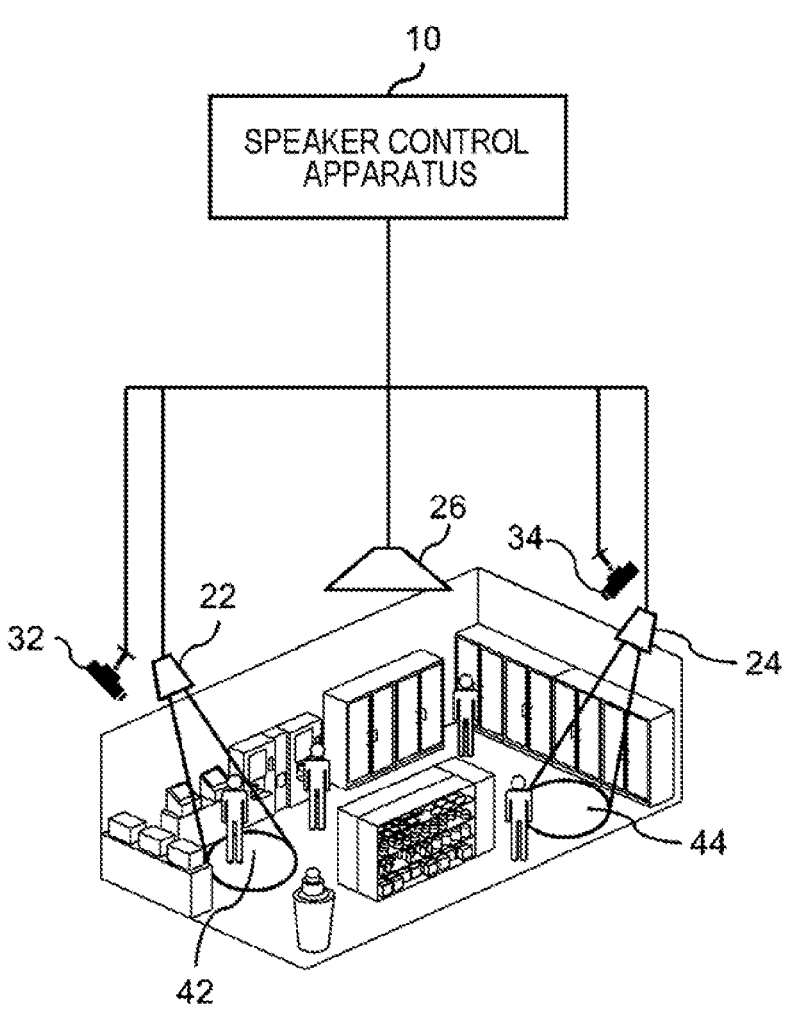
FIG. 7 It is a diagram illustrating a usage environment of a control apparatus according to a second example embodiment.

FIG. 7 is a diagram illustrating a usage environment of a control apparatus 10 according to a present example embodiment. The usage environment of the control apparatus 10 according to the present example embodiment is similar to the usage environment illustrated in FIG. 1 except for a point that at least one speaker 26 is provided in a store, in addition to speakers 22 and 24 including directivity.

The speaker 26 does not include directivity, and can convey a voice in a wide range as compared with the speakers 22 and 24. A range within which a voice from the speaker 26 reaches also includes partial areas 42 and 44.

Then, a control unit 120 of the control apparatus 10 controls the speaker 22 (or the speaker 24), and the speaker 26 independently of each other by presence or absence of a person in the partial area 42 (or the partial area 44).

For example, when position information indicates that a person is not present in either of the partial area 42 or the partial area 44, the control unit 120 supplies sound data to the speaker 26. The sound data are different from both of first sound data to be supplied to the speaker 22, and second sound data to be supplied to the speaker 24. Sound data to be supplied to the speaker 26 may be a voice input to a microphone by a salesperson at that time, or may be read from a sound data storage unit 130. Further, the control unit 120 does not supply sound data to either of the speaker 22 or the speaker 24.

Then, when position information indicates that a person is present in at least one of the partial areas 42 and 44, the control unit 120 stops supply of sound data to the speaker 26, or lowers a sound volume of the speaker 26. Further, when a person is present in the partial area 42, the control unit 120 supplies first sound data to the speaker 22, and when a person is present in the partial area 44, the control unit 120 supplies second sound data to the speaker 24.

Note that, the speaker 24 may not be provided. In this case, the control apparatus 10 controls the one speaker 22 including directivity, and the speaker 24 not including directivity. Further, in this case, an image capture apparatus 34 may not be provided.

According to the present example embodiment, when a person is not entering the partial areas 42 and 44, the person can recognize a voice to be output from the speaker 26. At this occasion, the speakers 22 and 24 do not output a voice. Further, when the person has entered the partial area 42 (or the partial area 44), the person can recognize a voice to be output from the speaker 22 (or the speaker 24). At this occasion, the speaker 26 does not output a voice, or a sound volume of the speaker 26 is lowered. Therefore, the person in the store can easily recognize information provided by the voice. Further, information can be provided exclusively to a person entering the partial area 42 (or the partial area 44).

Note that, in the present example embodiment, the control unit 120 may control a plurality of speakers including the speaker 26 independently of each other by using a result acquired by processing image data generated by image capture apparatuses 32 and 34, or another image capture apparatus (that is capturing an image inside a store). For example, the control unit 120 generates information relating a person in a store (e.g., a case of including only attribute information, or a case of including both of position information and attribute information of a person) by processing image data. Then, the control unit 120 controls the plurality of speakers independently of each other by using the information. Herein, a control target is at least one of sound data to be supplied to each speaker, a timing of supplying sound data to each speaker, and a sound volume of each speaker.

In the foregoing, example embodiments according to the present invention have been described with reference to the drawings, however, these are examples of the present invention, and various configurations other than the above can also be adopted.

Further, in the plurality of flowcharts used in the above description, a plurality of processes (pieces of processing) are described in order, but an order of execution of processes to be performed in each example embodiment is not limited to the order of description. In each example embodiment, the order of illustrated processes may be changed within a range that does not adversely affect a content. Further, the above-described example embodiments may be combined, as far as contents do not conflict with each other.

A part or all of the above-described example embodiments may also be described as the following supplementary notes, but is not limited to the following.

1. A control apparatus including:

a position information acquiring unit that acquires position information indicating a position of a person in a store; and a control unit that controls a plurality of speakers installed at a position different from each other in the store by using the position information, in which the control unit controls a control target for the plurality of speakers by using the position information, the control target including at least one of a type of sound data to be supplied, a sound volume, and a timing at which the sound data are supplied to the speaker.

2. The control apparatus according to supplementary note 1, in which the control unit includes a common mode in which same control is performed for the plurality of speakers, and an independent mode in which the plurality of speakers are controlled independently of each other, and controls the control target by using the position information in the independent mode.

3. The control apparatus according to supplementary note 1 or 2, in which
the speaker being a first speaker includes directivity, and the speaker being a second speaker does not include directivity.

4. The control apparatus according to supplementary note 3, in which
a first partial area associated with the first speaker is set in the store, and the control unit,
when the position information indicates that a person is not present in the first partial area, does not supply the sound data being first sound data to the first speaker, and supplies the sound data being second sound data to the second speaker, and,
when the position information indicates that a person is present in the first partial area, does not supply the second sound data to the second speaker or lowers a sound volume of the second speaker, and supplies the first sound data to the first speaker.

5. The control apparatus according to any of supplementary notes 1 to 4, in which
the position information is generated by using image data indicating inside the store.

6. The control apparatus according to supplementary note 5, in which
the speaker being a first speaker includes directivity,
a partial area associated with the first speaker is set in the store,
the position information further includes an attribute of the person being present in the partial area,
an attribute of the person is generated by using the image data, and
the control unit selects the sound data by using the attribute of the person.

7. The control apparatus according to any of supplementary notes 1 to 6, in which
the speaker being a first speaker, and the speaker being a second speaker include directivity,
a first partial area associated with the first speaker, and a second partial area associated with the second speaker are set in the store, and
the control unit,
when the position information indicates that a person is present in the first partial area, supplies the sound data being first sound data to the first speaker, and,
when the position information indicates that a person is present in the second partial area, supplies the sound data being second sound data to the second speaker.

8. A control apparatus including:
an image data acquiring unit that acquires image data indicating inside a store;
an image processing unit that generates person information being information relating to a person in the store by processing the image data; and
a control unit that controls a plurality of speakers installed in the store independently of each other by using the person information.

9. The control apparatus according to supplementary note 8, in which
the control unit controls, for each of the plurality of speakers, at least one of sound data to be supplied to the speaker, a timing at which the sound data are supplied to the speaker, and a sound volume of the speaker independently of one another.

10. A control method including,
by a computer:
position information acquiring processing of acquiring position information indicating a position of a person in a store; and
control processing of controlling a plurality of speakers installed at a position different from each other in the store by using the position information, in which
the control processing includes, by the computer, controlling a control target for a plurality of speakers by using the position information, the control target including at least one of a type of sound data to be supplied, a sound volume, and a timing at which the sound data are supplied to the speaker.

11. The control method according to supplementary note 10, in which
the control processing includes, by the computer,
a common mode in which same control is performed for the plurality of speakers, and an independent mode in which the plurality of speakers are controlled independently of each other, and controlling the control target by using the position information in the independent mode.

12. The control method according to supplementary note 10 or 11, in which
the speaker being a first speaker includes directivity, and the speaker being a second speaker does not include directivity.

13. The control method according to supplementary note 12, in which
a first partial area associated with the first speaker is set in the store, and
the control processing includes, by the computer,
when the position information indicates that a person is not present in the first partial area, not supplying the sound data being first sound data to the first speaker, and supplying the sound data being second sound data to the second speaker, and,
when the position information indicates that a person is present in the first partial area, not supplying the second sound data to the second speaker or lowering a sound volume of the second speaker, and supplying the first sound data to the first speaker.

14. The control method according to any of supplementary notes 10 to 13, in which
the position information is generated by using image data indicating inside the store.

15. The control method according to supplementary note 14, in which
the speaker being a first speaker includes directivity,
a partial area associated with the first speaker is set in the store,
the position information further includes an attribute of the person being present in the partial area,
an attribute of the person is generated by using the image data, and
the control processing includes, by the computer, selecting the sound data by using the attribute of the person.

16. The control method according to any of supplementary notes 10 to 15, in which
the speaker being a first speaker, and the speaker being a second speaker include directivity, a first partial area associated with the first speaker, and a second partial area associated with the second speaker are set in the store, and the control processing includes, by the computer, when the position information indicates that a person is present in the first partial area, supplying the sound data being first sound data to the first speaker, and, when the position information indicates that a person is present in the second partial area, supplying the sound data being second sound data to the second speaker.

17. A control method including, by a computer:

image data acquiring processing of acquiring image data indicating inside a store;

image processing of generating person information being information relating to a person in the store by processing the image data; and control processing of controlling a plurality of speakers installed in the store independently of each other by using the person information.

18. The control method according to supplementary note 17, in which the control processing includes, by the computer, controlling, for each of the plurality of speakers, at least one of sound data to be supplied to the speaker, a timing at which the sound data are supplied to the speaker, and a sound volume of the speaker independently of one another.

19. A program causing a computer to include:

a position information acquiring function of acquiring position information indicating a position of a person in a store; and a control function of controlling a plurality of speakers installed at a position different from each other in the store by using the position information, in which the control function controls a control target being at least one of a type of sound data to be supplied, a sound volume, and a timing at which the sound data are supplied to the speaker by using the position information for a plurality of speakers.

20. The program according to supplementary note 19, in which the control function includes a common mode in which same control is performed for the plurality of speakers, and an independent mode in which the plurality of speakers are controlled independently of each other, and controls the control target by using the position information in the independent mode.

21. The program according to supplementary note 19 or 20, in which the speaker being a first speaker includes directivity, and the speaker being a second speaker does not include directivity.

22. The program according to supplementary note 21, in which a first partial area associated with the first speaker is set in the store, and the control function, when the position information indicates that a person is not present in the first partial area, does not supply the sound data being first sound data to the first speaker, and supplies the sound data being second sound data to the second speaker, and, when the position information indicates that a person is present in the first partial area, does not supply the second sound data to the second speaker or lowers a sound volume of the second speaker, and supplies the first sound data to the first speaker.

23. The program according to any of supplementary notes 19 to 22, in which the position information is generated by using image data indicating inside the store.

24. The program according to supplementary note 23, in which the speaker being a first speaker includes directivity, a partial area associated with the first speaker is set in the store, the position information further includes an attribute of the person being present in the partial area, an attribute of the person is generated by using the image data, and the control function selects the sound data by using the attribute of the person.

25. The program according to any of supplementary notes 19 to 24, in which the speaker being a first speaker, and the speaker being a second speaker include directivity, a first partial area associated with the first speaker, and a second partial area associated with the second speaker are set in the store, and the control function, when the position information indicates that a person is present in the first partial area, supplies the sound data being first sound data to the first speaker, and, when the position information indicates that a person is present in the second partial area, supplies the sound data being second sound data to the second speaker.

26. A program causing a computer to include:

an image data acquiring function of acquiring image data indicating inside a store;

an image processing function of generating person information being information relating to a person in the store by processing the image data; and a control function of controlling a plurality of speakers installed in the store independently of each other by using the person information.

27. The program according to supplementary note 26, in which the control function controls, for each of the plurality of speakers, at least one of sound data to be supplied to the speaker, a timing at which the sound data are supplied to the speaker, and a sound volume of the speaker independently of one another.

28. A system including:

the control apparatus according to any of supplementary notes 1 to 7; and the plurality of speakers.

REFERENCE SIGNS LIST

10 Control apparatus
22, 24, 26 Speaker
32, 34 Image capture apparatus
42, 44 Partial area
110 Position information acquiring unit
120 Control unit
130 Sound data storage unit

What is claimed is:

1. A control apparatus comprising:

at least one memory configured to store instructions; and at least one processor configured to execute the instructions to perform operations, the operations comprising:

acquiring position information indicating a position of a person in a store; and controlling a plurality of speakers installed at a position different from each other in the store by using the position information, wherein the plurality of speakers comprises a first speaker with directivity to a first partial area in the store and a second speaker with no directivity in the store, and the operations further comprise, when the position information indicates that a person is not present in the first partial area, not supplying first sound data to the first speaker, and supplying second sound data to the second speaker, and, when the position information indicates that a person is present in the first partial area, not supplying the second sound data to the second speaker or lowering a sound volume of the second speaker, and supplying the first sound data to the first speaker.

2. The control apparatus according to claim 1, wherein the operations includes a common mode in which same control is performed for the plurality of speakers, and an independent mode in which the plurality of speakers are controlled independently of each other, and the operations further comprise controlling a control target for the plurality of speakers by using the position information in the independent mode, the control target including at least one of a type of sound data to be supplied, the sound volume, and a timing of sound data to be supplied to the plurality of speakers.

3. The control apparatus according to claim 1, wherein the position information is generated by using image data indicating an inside of the store.

4. The control apparatus according to claim 3, wherein the position information further includes an attribute of the person being present in the first partial area, the attribute of the person is generated by using the image data, and the operations further comprise selecting a sound data by using the attribute of the person.

5. The control apparatus according to claim 1, wherein the plurality of speakers further comprises a third speaker with directivity to a second partial area in the store, and the operations further comprise, when the position information indicates that a person is present in the first partial area, supplying the first sound data to the first speaker, and, when the position information indicates that a person is present in the second partial area, supplying the second sound data to the second speaker.

6. A control apparatus comprising:

at least one memory configured to store instructions; and at least one processor configured to execute the instructions to perform operations, the operations comprising:

acquiring image data indicating an inside of a store;

generating person information relating to a person in the store by processing the image data; and controlling a plurality of speakers installed in the store independently of each other by using the person information, wherein the plurality of speakers comprises a first speaker with directivity to a first partial area in the store and a second speaker with no directivity in the store, and the operations further comprise, when the position information indicates that a person is not present in the first partial area, not supplying first sound data to the first speaker, and supplying second sound data to the second speaker, and, when the position information indicates that a person is present in the first partial area, not supplying the second sound data to the second speaker or lowering a sound volume of the second speaker, and supplying the first sound data to the first speaker.

7. A control method performed by a computer, the control method comprising:

acquiring position information indicating a position of a person in a store; and controlling a plurality of speakers installed at a position different from each other in the store by using the position information, wherein the plurality of speakers comprises a first speaker with directivity to a first partial area in the store and a second speaker with no directivity in the store, and the control method further comprises, when the position information indicates that a person is not present in the first partial area, not supplying first sound data to the first speaker, and supplying second sound data to the second speaker, and, when the position information indicates that a person is present in the first partial area, not supplying the second sound data to the second speaker or lowering a sound volume of the second speaker, and supplying the first sound data to the first speaker.

* * * * *